US010882780B2

(12) United States Patent
Conti et al.

(10) Patent No.: US 10,882,780 B2
(45) Date of Patent: Jan. 5, 2021

(54) PROCESS FOR MANUFACTURING A GLAZING, AND GLAZING THEREBY PRODUCED

(71) Applicant: Pilkington Group Limited, Lancashire (GB)

(72) Inventors: Angelo Conti, San Salvo (IT); Giovanni Gagliardi, Chieti (IT); Leandro Grassia, Termoli (IT)

(73) Assignee: PILKINGTON GROUP LIMITED, Lancashire (GB)

(*) Notice: Subject to any disclaimer, the term of this patent is extended or adjusted under 35 U.S.C. 154(b) by 286 days.

(21) Appl. No.: 15/768,942

(22) PCT Filed: Oct. 21, 2016

(86) PCT No.: PCT/GB2016/053302
§ 371 (c)(1),
(2) Date: Apr. 17, 2018

(87) PCT Pub. No.: WO2017/068368
PCT Pub. Date: Apr. 27, 2017

(65) Prior Publication Data
US 2018/0305245 A1 Oct. 25, 2018

(30) Foreign Application Priority Data

Oct. 23, 2015 (EP) ...................................... 15425088
Feb. 18, 2016 (GB) ...................................... 1602825.0

(51) Int. Cl.
*C03C 17/04* (2006.01)
*C03C 17/00* (2006.01)
(Continued)

(52) U.S. Cl.
CPC ........ *C03C 17/04* (2013.01); *B32B 17/10036* (2013.01); *B32B 17/10128* (2013.01);
(Continued)

(58) Field of Classification Search
None
See application file for complete search history.

(56) References Cited

U.S. PATENT DOCUMENTS 3,489,588 A 1/1970 Mansur et al.
3,510,343 A * 5/1970 Twells ...................... C03C 4/00
428/427
(Continued)

FOREIGN PATENT DOCUMENTS

CN 1950201 A 4/2007
CN 101531833 A 9/2009
(Continued)

OTHER PUBLICATIONS

BASF the Chemical Company, "Cool down you paint, Xfast® stir-in pigments for solar heat management," www.basf.com/pigment (8 pages).
(Continued)

*Primary Examiner* — John J Figueroa
(74) *Attorney, Agent, or Firm* — Buchanan Ingersoll & Rooney PC

(57) ABSTRACT

A glazing comprises a glass substrate having an enamel layer adhered to at least a first surface portion, the enamel comprising 20 to 80 wt % frit and 10 to 50 wt % inorganic pigment. The thickness of the enamel layer is 2 μm to 50 μm, and the inorganic pigment has an infra-red reflectance such that the infra-red reflectance of the first portion of the glass substrate surface is 37% or higher over a region in the wavelength range 800 nm to 2250 nm. The glazing may be laminated, and may be a vehicle windscreen. A process for producing the glazing involves applying ink to a glass substrate, curing the ink thereby producing an enamel adhered to the glass substrate, and shaping the glass substrate by heating to a temperature above 570° C. The
(Continued)

preferred inorganic pigments are of the Fe and/or Cr type in spinel, haematite or corundum crystal form.

19 Claims, 3 Drawing Sheets

(51) Int. Cl.
| | | |
|---|---|---|
| B32B 17/10 | (2006.01) | |
| C03C 8/02 | (2006.01) | |
| C03C 8/14 | (2006.01) | |
| C03C 3/066 | (2006.01) | |
| B32B 27/30 | (2006.01) | |
| B32B 27/42 | (2006.01) | |
| B32B 27/06 | (2006.01) | |
| C03B 23/023 | (2006.01) | |
| C03C 8/04 | (2006.01) | |
| C03C 8/16 | (2006.01) | |

(52) U.S. Cl.
CPC .. *B32B 17/10348* (2013.01); *B32B 17/10761* (2013.01); *B32B 17/10935* (2013.01); *B32B 17/10981* (2013.01); *B32B 27/06* (2013.01); *B32B 27/30* (2013.01); *B32B 27/42* (2013.01); *C03B 23/023* (2013.01); *C03C 3/066* (2013.01); *C03C 8/02* (2013.01); *C03C 8/04* (2013.01); *C03C 8/14* (2013.01); *C03C 8/16* (2013.01); *C03C 17/007* (2013.01); *C03C 17/008* (2013.01); *B32B 2250/03* (2013.01); *B32B 2250/40* (2013.01); *B32B 2255/00* (2013.01); *B32B 2255/20* (2013.01); *B32B 2307/4023* (2013.01); *B32B 2307/416* (2013.01); *B32B 2605/00* (2013.01); *B32B 2605/08* (2013.01); *C03C 2209/00* (2013.01); *C03C 2217/228* (2013.01); *C03C 2217/452* (2013.01); *C03C 2217/475* (2013.01); *C03C 2217/485* (2013.01); *C03C 2217/70* (2013.01); *C03C 2218/119* (2013.01)

(56) References Cited

U.S. PATENT DOCUMENTS

| | | |
|---|---|---|
| 3,869,198 A | 3/1975 | Ballentine |
| 3,951,525 A | 4/1976 | Ballentine |
| 4,916,014 A | 4/1990 | Weber et al. |
| 4,954,153 A | 9/1990 | Coleman et al. |
| 5,443,669 A | 8/1995 | Tünker |
| 5,518,535 A | 5/1996 | Boaz |
| 5,605,591 A * | 2/1997 | Beyrle .............. B32B 17/10036 156/106 |
| 5,677,064 A | 10/1997 | Boaz |
| 5,677,251 A | 10/1997 | Sakoske |
| 5,698,025 A | 12/1997 | Boaz |
| 5,698,026 A | 12/1997 | Boaz |
| 5,938,834 A | 8/1999 | Boaz |
| 6,105,394 A | 8/2000 | Sridharan et al. |
| 6,126,737 A | 10/2000 | Mason |
| 6,171,383 B1 | 1/2001 | Sakoske et al. |
| 6,174,360 B1 | 1/2001 | Sliwinski et al. |
| 6,221,147 B1 | 4/2001 | Sakoske et al. |
| 6,255,239 B1 * | 7/2001 | Sakoske .................. C03C 3/064 428/427 |
| 6,387,513 B1 * | 5/2002 | Beyrle ..................... C03C 8/14 65/134.1 |
| 6,416,868 B1 | 7/2002 | Sullivan et al. |
| 6,454,848 B2 | 9/2002 | Sliwinski et al. |
| 6,485,557 B1 | 11/2002 | Swiler |
| 6,498,117 B1 * | 12/2002 | Beyrle ..................... C03C 8/18 501/16 |
| 7,056,380 B2 | 6/2006 | Beyrle |
| 7,832,233 B2 | 11/2010 | Brown et al. |
| 8,129,466 B2 | 3/2012 | Polk et al. |
| 8,546,475 B2 | 10/2013 | Maruyama et al. |
| 8,679,617 B2 | 3/2014 | Eibon et al. |
| 8,822,025 B2 | 9/2014 | Decker et al. |
| 8,932,724 B2 | 1/2015 | Woolf |
| 9,056,988 B2 | 6/2015 | Decker et al. |
| 2001/0019772 A1 | 9/2001 | Boaz |
| 2002/0034644 A1 | 3/2002 | Swiler et al. |
| 2003/0186799 A1 * | 10/2003 | Beyrle ...................... C03C 8/16 501/14 |
| 2005/0238887 A1 | 10/2005 | D'Errico |
| 2008/0210122 A1 | 9/2008 | Magdassi et al. |
| 2010/0047620 A1 * | 2/2010 | Decker .................... B05D 7/54 428/688 |
| 2010/0190001 A1 | 7/2010 | Barton et al. |
| 2013/0008346 A1 | 1/2013 | White et al. |
| 2014/0057112 A1 * | 2/2014 | Lang .................... C01G 25/006 428/402 |
| 2014/0335329 A1 | 11/2014 | Abayasinghe et al. |
| 2015/0152238 A1 | 6/2015 | Kobyashi |
| 2015/0185656 A1 | 7/2015 | Ito et al. |
| 2016/0185656 A1 | 6/2016 | Danneels et al. |
| 2016/0264455 A1 * | 9/2016 | Weber .................. H05B 6/1209 |
| 2017/0015180 A1 | 1/2017 | Sakamoto et al. |
| 2017/0044656 A1 * | 2/2017 | Chahboune ........... C03C 17/002 |
| 2017/0240459 A1 | 8/2017 | Gioffreda et al. |
| 2018/0257342 A1 | 9/2018 | Yano et al. |

FOREIGN PATENT DOCUMENTS

| | | |
|---|---|---|
| CN | 103717534 A | 4/2014 |
| CN | 104334648 A | 2/2015 |
| CN | 104673038 A | 6/2015 |
| DE | 10 2008 052 340 A1 | 4/2010 |
| EP | 0 415 020 A1 | 3/1991 |
| GB | 1 443 532 A | 7/1976 |
| JP | 2001-322835 A | 11/2001 |
| JP | 2002-038048 A | 2/2002 |
| JP | 2009-035444 A | 2/2009 |
| WO | 01/42374 A1 | 6/2001 |
| WO | WO 2013/023832 A1 | 2/2013 |
| WO | 2015/137518 A1 | 9/2015 |

OTHER PUBLICATIONS

BASF the Chemical Company, "Paint it cool! Pigments for solar heat management in paints," www.basf.com/pigment (12 pages).
CAS Chemnet information of pigment Hematite chromium green black 68909-79-5, http://www.chemnet.com/cas/es/68909-79-5/ Hematite,%20chromium%20green%20black.html, (1 page).
Cathay Pigments Material Safety Data Sheet for Micronised Chrome Oxide Green, Pigment Green 17, (3 pages).
Clariant, "IR-reflecting pigments Tinting Solutions for Sustainable Facade coatings," (4 pages).
Faulkner et al., "High Performance Pigments," Second, Completely and Extended Edition, WILEY-VCH Verlag GmbH & Co. KGaA, (2009) (3 page excerpt).
Ferro, Product Information—10241 Eclipse IR Green (1 page).
Ferro, Technical Information PS02 01/11, Performance Pigments and Colors, Cool Colors, (6 pages).
Heubach Competence in color, IR Reflecting Pigments Hot Pigments for Cool Solutions, (Jun. 2014) (8 pages).
Eronen, "SAG Bending Windshields—Introduction of Key Process Parameters to Superior Optical Quality," Glass Performance Days (2012), Leverage from the EU, www.gpd.fi (5 pages).
Vockler et al., "Solutions to Common Obscuration Band Problems," Article retrieved Oct. 1, 2015 from: http://www.icdcoatings.com/ products-2/ceramiglass-glass-coating/ceramiglass-auto-glass-decoration-on-s2-s3/ (2 pages).
European Search Report dated Mar. 29, 2016, by the European Patent Office in corresponding European Patent Application No. 15 42 5088.0. (6 pages).
United Kingdom Search Report dated Aug. 15, 2016, by the Intellectual Property Office in corresponding United Kingdom Application No. 1602825.0. (3 pages).

(56) References Cited

OTHER PUBLICATIONS

International Search Report (PCT/ISA/210) dated Nov. 29, 2016, by the European Patent Office as the International Searching Authority for International Application No. PCT/GB2016/053302.
Written Opinion (PCT/ISA/237) dated Nov. 29, 2016, by the European Patent Office as the International Searching Authority for International Application No. PCT/GB2016/053302.
Office Action (Notification of the First Office Action) dated Jul. 3, 2020, by the China National Intellectual Property Administration in corresponding Chinese Patent Application No. 201680061828.5 and an English Translation of the Office Action. (17 pages).
An English Translation of the Office Action (Notification of Reasons for Refusal) dated Jul. 28, 2020, by the Japanese Patent Office in corresponding Japanese Patent Application No. 2018-520512. (9 pages).
Office Action (1st Examination Report) dated Jul. 29, 2020, by the Intellectual Property India in corresponding India Patent Application No. 201847014851 and an English Translation of the Office Action. (6 pages).

\* cited by examiner

PROCESS FOR MANUFACTURING A GLAZING, AND GLAZING THEREBY PRODUCED

The present invention relates to glazings comprising glass substrates having an enameled portion, to laminated glazings including automotive and architectural glazings, to processes for producing such glazings and to processes for producing shaped laminated glazings.

It is known to print enamel inks on glass, e.g. by means of screen printing. Enamel inks typically comprise a frit (flux), pigment and liquid component (e.g. an oil) which acts as a vehicle to improve the screen printing properties of the enamel ink. After screen printing, the enamel ink may be cured (e.g. by ultraviolet irradiation) or dried (e.g. by heating to up to about 300° C.), and it is then fired by heating to high temperature to melt the flux and ensure excellent adhesion of the enamel to the glass surface. Such enamels, once fired, are durable to weathering and abrasion. The area of enamel on the glass may have various uses, for example to obscure and protect adhesives from daylight/ultraviolet (UV) light in automotive applications by being applied in a band on the periphery of an automotive glazing. Such bands of enamel are generally known as obscuration bands and are usually composed of black or very dark enamels opaque to visible and UV light. In other applications enamels may be applied by other techniques, have other colours and may absorb, to varying degrees, visible light and other wavelengths. The enamel may be applied in a variety of configurations, including patterns. Another application for enamels is solar control.

U.S. Pat. No. 6,171,383 discloses bismuth manganese oxide green pigments which possess improved reflectance characteristics, particularly in the infrared (IR) region.

U.S. Pat. No. 6,174,360 discloses solid solutions for inorganic colour pigments. More particularly, it discloses solid solutions having a corundum-hematite crystalline structure which are useful as inorganic colour pigments, some of which exhibit low Y CIE tri-stimulus values and high reflectivity in the near infrared portion of the electromagnetic spectrum.

U.S. Pat. No. 6,416,868 discloses pigments for plastics, glasses, ceramics, paints, enamels, inks and other types of materials, and more particularly relates to the use of alkaline earth-manganese oxide compositions as pigments.

US-A-2015/0 152 238 discloses a high solar reflectivity black pigment, and more specifically a black pigment comprising a $(Cr,Fe)_2O_3$ solid solution.

U.S. Pat. No. 8,546,475 discloses an infrared reflecting black pigment comprising iron and manganese.

Various processes have been disclosed to fire enamels printed on glass and also shape the printed glass substrate.

EP-A-0 415 020 (corresponding to U.S. Pat. No. 4,954, 153) discloses a method of preferentially heating a glass sheet having decorative ceramic enamel borders without adversely affecting the optical quality of the glass. The preferential heating is achieved by using heaters that radiate thermal energy at selected wavelengths that are more readily absorbed by the enamel than the glass so that the enamel heats more quickly than the glass. In one particular embodiment, glass with a ceramic enamel border is preheated to a temperature above its strain point temperature. The coated glass is then exposed to a quartz heater to preferentially heat the enamel to a sufficiently high temperature to fire it onto the glass. The ceramic enamel is then allowed to cool down to the temperature of the remainder of the glass.

U.S. Pat. No. 5,443,669 discloses a process for producing a laminated glass pane with single or double curvature, especially for a motor vehicle and, more particularly, for producing a glass pane having a printed pattern, especially for a motor vehicle windshield where that pattern can be a border. The printed pattern is formed using a screen-printable enamel ink comprising a glass-flux paste, at least one ceramic pigment, a binder-forming component and an organic screen-printing oil.

WO 2013/023832 A1 discloses automobile glazings comprising an enamel coating on at least part of the surface thereof, said coating acting as a barrier against light transmission. The glazing is characterised in that the enamel coating reflects more than 10%, and preferably more than 15%, of wavelengths higher than 800 nm. This is to address difficulties in controlling the temperatures of the glass sheets during thermal treatments, especially bending, resulting from the difference in absorption of infrared radiation by the enamelled sections of the glazing compared to that of the non-enamelled sections.

As mentioned above, in automotive (and other glazings) enamels may be used to apply obscuration bands around the periphery of the glazing. In laminated glass, e.g. windscreens, the obscuration band may be printed on surface 4 (i.e. the external surface of the laminate on the inside of the vehicle when installed) or an internal surface of the laminate (e.g. surface 2, which is a glass/polymer interface internal to the laminate formed by the internal surface of the glass ply whose other surface forms the external surface of the laminate on the outside of the vehicle when installed). Such bands are opaque and serve to hide components on the glazing such as fixings and also to provide UV protection to e.g. adhesives used to fix the glazing in position. Glazings with obscuration bands are usually shaped by heating to high temperature after the enamel has been applied to the glass substrate. Often, the enamel will be fired by the heating step.

After shaping, optical distortion may arise at the boundary between printed/non-printed areas of the glass. Such optical distortion is sometimes called "burnline" as discussed in *SAG Bending Windshields Introduction of Key Process Parameters to Superior Optical Quality* by Mika Eronen (2012, Safety Glass Experts International Oy Ltd).

There have been attempts to reduce or eliminate burnline by modifying the bending process parameters in terms of temperature profile and/or to design, build and install shields on the glass bending tools/moulds. Other attempted solutions include always printing the obscuration band on an inside surface of a laminate (e.g. surface 2 or surface 3) as described in *Solutions to Common Obscuration Band Problems*, by Kris Vockler (2013, www.icdcoatings.com).

Unfortunately, such attempted solutions have been unsatisfactory and have disadvantages such as high extra costs and time to design, build, install and optimize tooling shields. Also, the general optical quality, in other areas of the shaped glass may be negatively affected by the additionally introduced shields. Furthermore, the attempted solutions may lead to further cosmetic issues caused by the enamel ink of the obscuration band under-firing.

The inventors of the present invention have surprisingly discovered that modifying the properties of the enamel may reduce or prevent burnline distortion and thereby avoid the problems of previous attempted solutions.

In a first aspect, the present invention accordingly provides a glazing comprising a glass substrate having a layer of enamel adhered to at least a first portion of a surface of the glass substrate, the enamel comprising 20 to 80 wt % frit and 10 to 50 wt % inorganic pigment, wherein the thickness of the layer of enamel is in the range 2 μm to 50 μm, characterised in that the inorganic pigment has an infra-red reflectance such that the infra-red reflectance of the first portion of the surface of the glass substrate is 37% or higher over a region in the wavelength range 800 nm to 2250 nm.

In an alternative aspect, the present invention provides a glazing comprising a glass substrate having an enamel adhered to at least a first portion of a surface of the glass substrate, the enamel comprising a fit and an inorganic pigment, characterised in that the enamel is adapted such that the infra-red reflectance of the first portion of the surface of the glass substrate is 27% or higher over a region in the wavelength range 800 nm to 2250 nm.

This is greatly advantageous because by modifying the properties of the enamel to increase spectral reflection at NIR (Near Infrared) and IR (Infrared) wavelength ranges (which may be equivalent to reducing the difference in emissivity between printed and non-printed glass surfaces, especially at medium and high temperatures) the burnline distortion is greatly reduced or removed. Thus, the invention provides significantly better results in terms of optical quality at the printed/non-printed area than previous attempted solutions with no requirement to develop, manufacture and build more expensive bending moulds with shields and also providing better overall optical quality in glass shaping. Furthermore, the invention avoids or reduces problems resulting from enamel under-firing.

Adapting the enamel to provide the IR reflective properties may be by selecting appropriate pigments, adjusting the amount and proportions of pigment (and/or frit) in the enamel and/or adjusting the thickness of the enamel (e.g. by changing the threads/cm of the screen if screen printed), all as discussed below.

Generally, the enamel may be adapted to be substantially opaque to visible light, such that the ISO 9050 visible light transmission of the enamelled first portion of the glazing is 1% or lower, preferably 0.5% or lower and more preferably 0.1% or lower. Opaque enamels are advantageous because they may provide patterning or obscuration on the glass.

The glass substrate may be unshaped (e.g. it may be a flat sheet of glass) but may be intended to go through a subsequent heat-treatment process for shaping and/or toughening but is preferably a shaped glass substrate. Usually, the enamel will be applied to a flat glass substrate which is subsequently shaped. This is generally advantageous because the enamel may be fired during the heat treatment to shape the glass substrate, allowing a single heating step. In some circumstances, however, the enamel may be applied to a glass substrate that has been shaped. In this case the enamel would usually be fired subsequently.

The enamel may be coloured to provide patterning and may preferably be very dark and more preferably substantially black in visible colour. Usually, the enamelled first portion of the surface of the glass substrate may form a peripheral portion of the glazing. Preferably, therefore, the enamelled first portion of the surface of the glass substrate may form an obscuration band.

It is preferred that the infra-red reflectance of the first portion of the glazing may be 38% or higher, preferably 39% or higher, more preferably 40% or higher, most preferably 41% or higher over a region in the wavelength range 800 nm to 2250 nm.

Preferably, the region in the wavelength range 800 nm to 2250 nm extends over 400 nm or greater, preferably 450 nm or greater, more preferably 550 nm or greater and most preferably 610 nm or greater. The region in the wavelength range 800 nm to 2250 nm may extend over 650 nm, 700 nm, 750 nm, 800 nm, or even 825 nm.

Preferably, the enamel is adapted to provide the IR reflective properties by selecting an appropriate infrared and/or near IR reflective pigment and including the infrared reflective pigment in the enamel is a suitable amount. In order to ensure good IR reflective properties, good colour and/or sufficient visible opacity, the enamel comprises 10 wt % to 50 wt % inorganic pigment, preferably 10 wt % to 40 wt %, more preferably 15 wt % to 35 wt %. Alternatively the amount of inorganic pigment may be 10 wt % to 15 wt % or 40 wt % to 50 wt %.

The infrared reflective inorganic pigments may be included in the ceramic inks used to print the enamel in an amount of about 0.1% to 50% by weight, or about 1% to 45% by weight, or about 5% to 40% by weight, or about 10% to 35% by weight, or about 15% to 30% by weight. Preferably, the infrared or near-infrared reflective inorganic pigments may be included in the ceramic inks in an amount in the range from about 10% to about 40% by weight, such as from about 20% to about 30% by weight, or from about 22% to about 28% by weight.

The infra-red reflectance of the inorganic pigments themselves, i.e. the pigments measured alone, before incorporation into an enamel ink, may be in the range 40 to 90%, preferably 50 to 85%.

Enamels contain frit particles which fuse during firing, creating a glassy layer that bonds chemically and mechanically to the substrate. The inorganic pigment(s) are provided in finely divided form, the pigment particles being dispersed in the glassy layer formed from the frit. The enamel comprises 20 wt % to 80 wt % frit, preferably 30 wt % to 75 wt %. Alternatively, the enamel may comprise 20 wt % to 40 wt % or 60 wt % to 80 wt % frit. As another alternative, the enamel comprises 30 wt % to 80 wt % frit, preferably 35 wt % to 75 wt %.

The frit normally comprises silica and metal oxides; preferably the oxide frit is free of lead or cadmium so as to meet environmental and health considerations.

The oxide frit may include particles of at least one compound selected from silica, titania, alumina, zirconia, compounds having fluoride ion (e.g. fluorite, fluorapatite, cryolite, etc.), bismuth oxide, zinc oxide, boron oxide, potassium oxide, sodium oxide, calcium oxide, barium oxide, lead oxide, lithium oxide, phosphorous oxide, molybdenum oxide, strontium oxide, and magnesium oxide. In some embodiments, multiple oxide fits may be blended and/or the particle size of the oxide frits may be controlled in order to achieve desired properties (e.g. melt temperature). For example, in some embodiments, the oxide frit used may use particles with sizes of less than 20 micron. An advantageous $D_{50}$ value for the oxide frit may range from about 2 micron to 6 micron. In one or more embodiments, the oxide frit may be included in the ceramic ink composition in an amount of about 20% to 80% by weight, or about 30% to 70% by weight, or about 40% to 60% by weight.

When silica is included in the oxide frit it may be included in the ceramic ink composition in an amount from about 1% to 60% by weight, or from about 5% to 55% by weight, or from about 10% to 45% by weight, or from about 15% to 35% by weight, or from about 18% to 28% by weight.

When bismuth oxide is included in the oxide fit it may be included in the ceramic ink composition in an amount from about 5% to 75% by weight, or from about 10% to 70% by weight, or from about 15% to 65% by weight, or from about 18% to 62% by weight.

When compounds having fluoride ion are included in the oxide fit they may be included in the ceramic ink composition in an amount ranging from about 0.1% to 5 percent by weight, or from about 0.5% to 4% by weight, or from about 1% to 3% by weight.

When zinc oxide is included in the oxide frit it may be included in the ceramic ink composition in an amount ranging from about 0.1% to 60% by weight, or from about 0.5% to 55% by weight, or from about 0.75% to 50% by weight, or from about 1% to about 45% by weight, or from about 1.25% to about 40% by weight, or from about 1.5% to about 30% by weight, or from about 1.75% to about 20% by weight or from about 2% to about 10% by weight, or from about 2.25% to about 8% by weight.

When potassium oxide is included in the oxide frit it may be included in the ceramic ink composition in an amount ranging from about 0.1% to 5 percent by weight, or from about 0.5% to 4% by weight, or from about 1% to 3% by weight.

When sodium oxide is included in the oxide frit it may be included in the ceramic ink composition in an amount ranging from about 1% to about 20% by weight, or from about 1.25% to about 15% by weight or from about, 1.5% to about 10% by weight, or from about 2% to about 5% by weight.

When lithium oxide is included in the oxide frit it may be included in the ceramic ink composition in an amount ranging from about 0.1% to 5 percent by weight, or from about 0.5% to 4.5% by weight, or from about 1% to 4% by weight.

When zirconia is included in the oxide frit it may be included in the ceramic ink composition in an amount ranging from about 0.1% to 15% by weight, or from about 0.25 to 10% by weight, or from about 0.5 to 5% by weight.

When titania is included in the oxide frit it may be included in the ceramic ink composition in an amount ranging from about 0.1% to 15% by weight, or from about 0.5 to 12% by weight, or from about 1 to 10% by weight.

When strontium oxide is included in the oxide frit it may be included in the ceramic ink composition in an amount ranging from about 0.1% to 5% by weight, or from about 0.25 to 2.5% by weight, or from about 0.5 to 2% by weight.

When calcium oxide is included in the oxide frit it may be included in the ceramic ink composition in an amount ranging from about 0.1% to 5 percent by weight, or from about 0.5% to 4% by weight, or from about 1% to 3% by weight.

When magnesium oxide is included in the oxide frit it may be included in the ceramic ink composition in an amount ranging from about 0.1% to 5% by weight, or from about 0.25 to 2.5% by weight, or from about 0.5 to 2% by weight.

When molybdenum oxide is included in the oxide fit it may be included in the ceramic ink composition in an amount ranging from about 0.1% to 5% by weight, or from about 0.25 to 2.5% by weight, or from about 0.5 to 2% by weight.

When phosphorous oxide is included in the oxide frit it may be included in the ceramic ink composition in an amount ranging from about 0.1% to 5 percent by weight, or from about 0.5% to 4% by weight, or from about 1% to 3% by weight.

When alumina is included in the oxide frit it may be included in the ceramic ink composition in an amount ranging from about 0.1% to 5 percent by weight, or from about 0.5% to 4% by weight, or from about 1% to 3% by weight.

When boron oxide is included in the oxide fit it may be included in the ceramic ink composition in an amount ranging from about 0.1% to 40% by weight, or from about 1% to 35% by weight, or from about 2.5% to about 30% by weight, or from about 5% to about 25% by weight, or from about 7.5% to about 20% by weight, or from about 10% to about 15% by weight.

It is the express purpose of including the above compound specific weight percent ranges in this disclosure so that any of the values included within the range for a specific compound may be combined with any other value included within the range for said compound to create a more defined weight percent range. Furthermore, multiple compounds may be included within an oxide frit according to this disclosure as long as their relative amounts fall within the weight percent ranges disclosed above or a more defined weight percent range that may be any of the values included within the range for a specific compound combined with any other value included within the range for said compound.

In one or more embodiments, the fit may be a zinc-based frit comprising zinc oxide and at least one of silica, compounds having fluoride ion, potassium oxide, sodium oxide, lithium oxide, zirconia, titania, strontium oxide, calcium oxide, magnesium oxide, molybdenum oxide, phosphorous oxide, alumina, and boron oxide. For example, in some embodiments the zinc-based frit may include about 5% to 55% by weight silica, about 0% to 5% by weight fluorine containing compounds, about 10% to 50% by weight zinc oxide, about 0% to 5% by weight potassium oxide, about 0 to 15% by weight sodium oxide, about 0% to 4% by weight lithium oxide, about 0% to 10% by weight zirconia, about 0% to 10% by weight titania, about 0% to 2% by weight strontium oxide, about 0% to 5% by weight calcium oxide, about 0% to 2% by weight magnesium oxide, about 0% to 2% by weight molybdenum oxide, about 0% to 5% by weight phosphorous oxide, about 0% to 5% by weight alumina, and about 10% to 28% by weight boron oxide.

For example, a zinc-based frit may be formulated according to Embodiments 1-3 shown in Table 1 below:

TABLE 1

| Component | Embodiment 1 (wt. %) | Embodiment 2 (wt. %) | Embodiment 3 (wt. %) |
|---|---|---|---|
| $SiO_2$ | 1-60 | 5-55 | 10-45 |
| $Bi_2O_3$ | — | — | — |
| Fluoride ion containing compounds | 0-5 | 0.5-4 | 1-3 |
| ZnO | 0.1-60 | 0.5-55 | 0.75-50 |
| $K_2O$ | 0-5 | 0.5-4 | 1-3 |
| $Na_2O$ | 0-20 | 1.25-15 | 2-5 |
| $Li_2O$ | 0-5 | 0.5-4.5 | 1-4 |
| $ZrO_2$ | 0-15 | 0.25-10 | 0.5-5 |
| $TiO_2$ | 0-15 | 0.5-12 | 1-10 |
| SrO | 0-5 | 0.25-2.5 | 0.5-2 |
| CaO | 0-5 | 0.5-4 | 1-3 |
| MgO | 0-5 | 0.25-2.5 | 0.5-2 |
| $MoO_3$ | 0-5 | 0.25-2.5 | 0.5-2 |
| $P_2O_5$ | 0-5 | 0.5-4 | 1-3 |
| $Al_2O_3$ | 0-5 | 0.5-4 | 1-3 |
| $B_2O_3$ | 0.1-40 | 2.5-30 | 10-15 |

In one or more embodiments, the frit may be a bismuth-based frit comprising bismuth oxide and at least one of silica, zinc oxide, compounds having fluoride ion, potassium oxide, sodium oxide, lithium oxide, zirconia, titania, strontium oxide, calcium oxide, magnesium oxide, molybdenum oxide, phosphorous oxide, alumina, and boron oxide.

For example, in some embodiments the bismuth-based frit may include about 3% to 40% by weight silica, 10% to 65% by weight bismuth oxide, 0% to 5% by weight fluorine containing compounds, 0% to 20% by weight zinc oxide, 0% to 5% by weight potassium oxide, 0 to 8% by weight sodium oxide, 0% to 4% by weight lithium oxide, 0% to 6% by weight zirconia, 0% to 10% by weight titania, 0% to 2% by weight strontium oxide, 0% to 5% by weight calcium oxide, 0% to 2% by weight magnesium oxide, 0% to 2% by weight molybdenum oxide, 0% to 5% by weight phosphorous oxide, 0% to 5% by weight alumina, and 2% to 20% by weight boron oxide.

In other embodiments the bismuth-based frit may include about 10% to 30% by weight silica, 40% to 65% by weight bismuth oxide, 1% to 10% by weight zinc oxide, 0.05% to 2% by weight potassium oxide, 1% to 6% by weight sodium oxide, 0.05% to 2% by weight zirconia, 0.5% to 5% by weight alumina, and 6% to 16% by weight boron oxide. In yet other embodiments the bismuth-based frit may include about 13% to 23% by weight silica, 50% to 65% by weight bismuth oxide, 2% to 6% by weight zinc oxide, 0.05% to 0.5% by weight potassium oxide, 2% to 5% by weight sodium oxide, 0.1% to 1% by weight zirconia, 1% to 4% by weight alumina, and 8% to 15% by weight boron oxide.

For example, a bismuth-based frit may be formulated according to Embodiments 4-6 shown in Table 2 below:

TABLE 2

| Component | Embodiment 4 (wt. %) | Embodiment 5 (wt. %) | Embodiment 6 (wt. %) |
|---|---|---|---|
| $SiO_2$ | 1-60 | 10-45 | 18-28 |
| $Bi_2O_3$ | 5-75 | 10-70 | 18-62 |
| Fluoride ion containing compounds | 0-5 | 0.5-4 | 1-3 |
| ZnO | 0.1-60 | 1-45 | 1.75-20 |
| $K_2O$ | 0-5 | 0.5-4 | 1-3 |
| $Na_2O$ | 0-20 | 1.5-10 | 2-5 |
| $Li_2O$ | 0-5 | 0.5-4.5 | 1-4 |
| $ZrO_2$ | 0-15 | 0.25-10 | 0.5-5 |
| $TiO_2$ | 0-15 | 0.5-12 | 1-10 |
| SrO | 0-5 | 0.25-2.5 | 0.5-2 |
| CaO | 0-5 | 0.5-4 | 1-3 |
| MgO | 0-5 | 0.25-2.5 | 0.5-2 |
| $MoO_3$ | 0-5 | 0.25-2.5 | 0.5-2 |
| $P_2O_5$ | 0-5 | 0.5-4 | 1-3 |
| $Al_2O_3$ | 0-5 | 0.5-4 | 1-3 |
| $B_2O_3$ | 0.1-40 | 2.5-30 | 7.5-20 |

The frit (also known as flux) may be a glass composition, for example a borosilicate glass composition. The frit may be such that the silicon/boron (Si/B) weight % ratio of the enamel is 10 or lower, 8 or lower, 6 or lower, 4 or lower, 3 or lower, preferably 2 or lower and more preferably 1.5 or lower.

Analysis of the enamel to determine Si and B content may be by X ray fluorescence (XRF) for silicon and inductively coupled plasma mass spectrometry for boron. Generally, the ratio of Si/B may be the ratio in wt % in the enamel once fired on to the glass substrate or the ratio in wt % (dry weight basis) of the enamel ink used to produce the enamelled portion.

Surprisingly, suitable infrared reflective inorganic pigments may be the inorganic pigments comprising a material exhibiting substantially a spinel crystal structure, an inverse spinel crystal structure, a haematite crystal structure, a corundum crystal structure or a rutile crystal structure. The preferred pigments comprise a material exhibiting substantially a corundum crystal structure.

A suitable inorganic pigment may comprise a pigment selected from a Fe/Cr pigment, a Co/Al pigment, a Co/Al/Cr pigment a Co/Ti pigment, a Co/Cr pigment, a Ni/Fe/Cr pigment, a Ti/Cr/Sb pigment, a Fe pigment, a Cr pigment and/or a mixture of two or more of these pigments. The preferred inorganic pigment is a Fe pigment. The most preferred pigments comprise both iron and chromium. Fe/Cr pigments may be, for example, $CrFeO_3$ (chromium iron oxide) preferably with a corundum-type structure (e.g. rhombohedral).

More particularly, a suitable inorganic pigment may be selected from one or more of pigment blue 28 (CI 77346; CAS 1345-16-0), pigment blue 29 (CI 77007; CAS 57455-37-5, 67053-79-6), pigment green 50 (CI 77377; CAS 68186-85-6), pigment black 30 (CI 77504; CAS 71631-15-7), pigment black 33 (CI 77537; CAS 68186-94-7), pigment blue 36 (CI 77343; CAS 68187-11-1), pigment green 17 (CI 77288; CAS 68909-79-5), pigment brown 35 (CI 77501; CAS 68187-09-7), pigment brown 24 (CI 77310; CAS 68186-90-3), pigment brown 29 (CI 77500; CAS 12737-27-8), pigment yellow 164 (CI 77899; CAS 68412-38-4), pigment brown 33 (CI 77503; CAS 68186-88-9), wherein the CI number refers to the Colour Index International reference database (jointly maintained by the Society of Dyers and Colourists and the American Association of Textile Chemists and Colorists) and CAS refers to the Chemical Abstracts Service Registry Number or CAS number, i.e. the numerical identifier assigned by CAS to every chemical substance.

Generally, a preferred inorganic pigment may be selected from chromium-iron pigments, preferably a ferrite pigment, additionally or alternatively a chromite pigment or a ferrite/chromite (also known as iron chromite) pigment. Particularly suitable pigments include a pigment that may be selected from pigment brown 33 (ZnFeCr type; CI 77503; CAS 68186-88-9), pigment brown 29 (FeCr type; CI 77500; CAS 12737-27-8), chromium green black haematite pigment green 17 (FeCr type; CI 77288; CAS 68909-79-5), pigment brown 35 (FeCr type; CI 77501; CAS 68187-09-7), pigment black 30 (NiCrMn type; CI 77504; CAS 71631-15-7).

The most preferred pigments are selected from chromium iron oxide pigment brown 29 (CI 77500; CAS 12737-27-8), pigment black 30 (CI 77504; CAS 71631-15-7), chromium green black haematite (CI 77288; CAS 68909-79-5) and chromium iron nickel oxide.

As discussed above, a preferred pigment comprises iron (especially iron III). Thus, it is preferred if the enamel comprises iron (determined as $Fe_2O_3$) in an amount of 5 wt % or greater of the total weight of the enamel, preferably in an amount of 10 wt % or greater of the total weight of the enamel, more preferably in an amount of 15 wt % or greater of the total weight of the enamel and most preferably in an amount of 20 wt % or greater of the total weight of the enamel. Generally, the wt % of iron may be the wt % of iron in the enamel once fired on to the glass substrate or the wt % (dry weight basis) of iron in the enamel ink used to produce the enamelled portion. Determination of the iron content may be by XRF or EDS and/or wet chemical methods.

It is preferred that the enamel comprises chromium (determined as $Cr_2O_3$) in an amount of 5 wt % or greater of the total weight of the enamel, preferably in an amount of 10 wt % or greater of the total weight of the enamel, more preferably in an amount of 15 wt % or greater of the total weight of the enamel and most preferably in an amount of 20 wt % or greater of the total weight of the enamel.

Generally, the wt % of chromium may be the wt % of chromium in the enamel once fired on to the glass substrate or the wt % (dry weight basis) of chromium in the enamel ink used to produce the enamelled portion. Determination of the chromium content may be by XRF, SEM or wet chemical methods.

Preferably, the enamel comprises chromium (determined as $Cr_2O_3$) in an amount of 25 wt % or lower of the total weight of the enamel.

Generally, the enamel layer will have a sufficient thickness to provide the appropriate visible and IR properties. Thus, the thickness of the enamel layer preferably after firing (or the total thickness of two or more enamel layers if, for example, enamel layers are printed on more than one surface of a laminate) adhered to the glass substrate may be in the range 2 μm to 50 μm, preferably 4 μm to 40 μm, more preferably 6 μm to 35 μm, most preferably 9 μm to 30 μm. Alternatively, the thickness of the enamel layer adhered to the glass substrate is in the range 4 μm to 45 μm, preferably 6 μm to 40 μm, more preferably 8 μm to 35 μm, most preferably 10 μm to 30 μm.

As discussed above, a great advantage of the present invention is that it significantly reduces burnline optical distortion. This may be particularly important in laminated glazings which may be used e.g. for automotive windshields.

Thus, the present invention accordingly provides in a second aspect, a laminated glazing comprising a first glass ply comprising a glass substrate according to the first aspect, a second glass ply and a polymer ply of interlayer which extends between the first and second glass plies, i.e. is "sandwiched" between the plies.

The glazing may be, in particular, a vehicle glazing (e.g. automotive, train, water vessel, aircraft) and/or an architectural glazing or glass in stoves, ovens or in white goods (e.g. freezers or refrigerators), or glass in display counters or in display cabinets.

Thus, the present invention provides in a third aspect, an automotive glazing generally according to the first or second aspect.

The present invention provides in a fourth aspect, an architectural glazing generally according to either the first or second aspect of the invention.

The glazings according to the invention may be made by printing enamel ink on the surface of the glass substrate, optionally drying and/or curing the ink and subsequently heating, often in a glass shaping step. Preferably, the enamel ink is printed on a flat glass substrate that is subsequently shaped. In some cases, the enamel ink may, however, be printed on a shaped glass substrate, optionally dried and/or cured and subsequently fired. A usually printing method is screen printing but other printing methods may be suitable including pad printing (tampography) or ink jet and/or other methods of digital printing.

In one or more embodiments, the ceramic ink comprises a liquid medium (also known as a vehicle or carrier) that is used to suspend the inorganic pigment and oxide frit so that they may be applied evenly and uniformly to the substrate surface prior to firing. The liquid medium may comprise a solvent (e.g. an alcohol), organic oil (e.g. one or more terpenes), polymeric precursors (e.g. acrylate precursors if the ink is intended to be cured by UV irradiation), and/or a viscosity adjusting additive (e.g. one or more glycols, e.g. butyl glycol). The liquid medium should be such that it evaporates or is otherwise removed during the optional drying, optional pre-firing or heat treatment process. The vehicle or carrier is included in the ceramic ink composition in an amount of about 10% to 40% by weight, preferably about 15% to 35% by weight, more preferably about 20% to 30% by weight.

In one or more embodiments, the vehicle comprises an organic solvent such as 2,2,4-trimethyl pentanediol monoisobutyrate; alpha-terpineol; beta-terpineol; gamma terpineol; tridecyl alcohol; diethylene glycol ethyl ether, diethylene glycol butyl ether; pine oils, vegetable oils, mineral oils, low molecular weight petroleum fractions, tridecyl alcohols, synthetic or natural resins (e.g., cellulosic resins or acrylate resins), PM (propylene glycol mono methyl ether), DPM (dipropylene glycol mono methyl ether), TPM (tripropylene glycol mono methyl ether), PnB (propylene glycol mono n-butyl ether), DPnB (dipropylene glycol mono butyl ether), TPNB (tripropylene glycol mono n-butyl ether), PnP (propylene glycol mono propyl ether), DPnP (dipropylene glycol mono propyl ether), TPNB-H (propylene glycol butyl ether), PMA (propylene glycol mono methyl ether acetate), Dowanol DB (Diethylene glycol mono butyl ether, available from (Dow Chemical Company, USA)) or other ethylene or propylene glycol ethers. In some embodiments, the vehicle may also be a mixture of two or more different organic solvents.

Further, the ceramic ink compositions may include wetting agents, dispersants, levelling agents, rheological modifiers, etc. to modulate the properties of the ceramic ink compositions and/or the enamel films resulting from their firing.

Thus, in a fifth aspect, the present invention provides a process for producing a glazing, the process comprising, providing a glass substrate, providing an enamel ink comprising 20 to 80 wt % frit, 10 to 50 wt % inorganic pigment and 10 to 40 wt % liquid medium, applying the enamel ink to at least a first portion of a surface of the glass substrate, optionally drying and/or curing the enamel ink, optionally pre-firing the enamel ink to a temperature above 480° C., and shaping the glass substrate by heating to a temperature above 570° C. thereby firing the enamel ink to produce a layer of enamel adhered to at least the first portion of the surface of the glass substrate, wherein the thickness of the layer of enamel is in the range 2 μm to 50 μm, characterised in that the inorganic pigment has an infra-red reflectance such that the infra-red reflectance of the first portion of the surface of the glass substrate is 37% or higher over a region in the wavelength range 800 nm to 2250 nm.

As mentioned above, the liquid medium preferably comprises a solvent, organic oil, polymeric precursor and/or a viscosity-adjusting additive.

Usually, the method of applying the enamel ink is by printing the ink on at least a first portion of a surface of the glass substrate, preferably a peripheral portion of the surface of the glass substrate. Preferably, the enamel ink is applied by screen printing.

As discussed herein the glazing may be a laminated glazing. Thus, in a sixth aspect the present invention provides a process for producing a shaped laminated glazing, the process comprising, providing a first glass substrate and a second glass substrate, providing an enamel ink comprising 20 to 80 wt % frit, 10 to 50 wt % inorganic pigment and 10 to 40 wt % liquid medium, applying the enamel ink to at least a first portion of a surface of the first glass substrate, optionally drying and/or curing the ink, optionally pre-firing the ink to a temperature above 480° C., shaping at least the first glass substrate by heating to a temperature above 570° C. thereby firing the enamel ink to produce a layer of enamel adhered to at least the first portion of the surface of the first glass substrate, wherein the thickness of the layer of enamel is in the range 2 μm to 50 μm, placing a polymer ply of interlayer between the first and second glass substrates, and laminating the first glass substrate, the polymer ply and the second glass substrate together, characterised in that the enamel is adapted such that the infra-red reflectance of the first portion of the surface of the first glass substrate is 37% or higher over a region in the wavelength range 800 nm to 2250 nm.

An obscuration band may of course be applied to any surface of a laminate, as needed.

The present invention will now be described by way of example only, and with reference to, the accompanying drawings, in which.

Figure 1A:
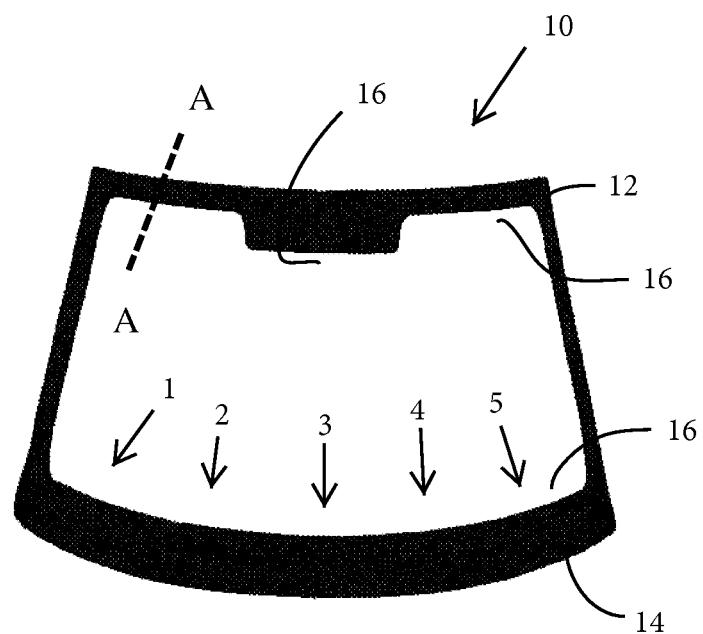
FIG. 1(a) is a schematic plan view of a laminated windscreen according to the invention and (b) is a schematic cross-sectional view of the windscreen of (a) on line A-A.
Figure 1B:
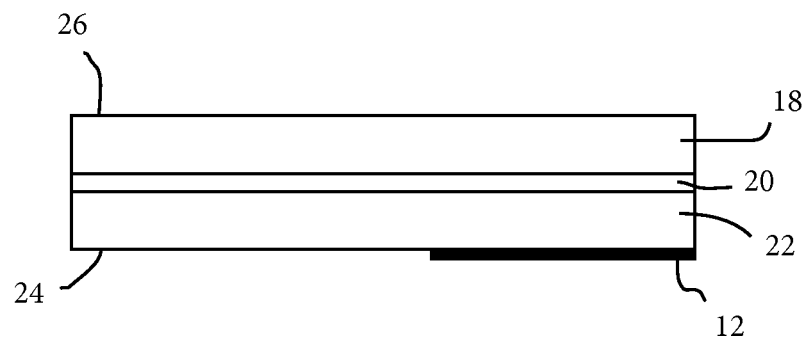

FIG. 1 illustrates a laminated glazing 10 according to the invention comprising an outer glass ply 18 with an outer surface 26 (surface 1, the outside surface when installed in a vehicle) and an inner glass ply 22 with an inner surface 24 (surface 4, inside when installed in a vehicle) laminated together by means of a polymer interlayer 20 of polyvinyl butyral (PVB). The laminated glazing is a windshield for a motor vehicle. Around the periphery of the laminated glazing 10 is printed on the inner glass ply 22, on the inner surface 24, an enamel obscuration band 12. The obscuration band comprises a layer of enamel formed by screen printing an enamel ink on the surface, curing/drying the ink and then firing the it thereby producing an enamel on the inner surface 24. The enamel (having the composition as in Example 1 or Example 2, below) comprises a frit and at least one inorganic pigment containing iron and chromium. At the boundary 16 between the clear glass and the obscuration band 12 there is an area susceptible to "buntline" optical distortion. In glazings according to the invention, buntline optical distortion is much reduced or prevented owing to the enamel used. At points 1, 2, 3, 4 and 5 as illustrated in FIG. 1 (a) optical distortion in glazings according to the invention (see Examples, below) and comparative examples may be determined.

A laminated glazing as illustrated in FIG. 1 may be made generally as follows. A flat glass substrate (e.g. 2.1 mm thick soda lime float glass) is subjected to screen printing (using a screen that may have e.g. 50 to 120 threads/cm polyester screen for example 77 or 100 threads/cm polyester screen) by a silk-screen and doctor blade with an enamel ink (having the composition, for example, as in Example 1 or Example 2, see below) to form a screen-printed border which is optionally dried by subjecting this substrate to infrared radiation from an infrared heater at a temperature below 300° C. Two glass substrates (one unprinted) are then stacked and the stacked substrates are subjected to bending. In this stage, a source of heat is provided and bending can be effected, usually by heating over 8 minutes to a temperature of 570° C., held at this temperature for a period of one minute and then bent at this temperature in any standard bending mould or frame by press or sag bending, The substrates are separated and then, after cooling, are laminated together using a PVB interlayer (about 0.76 mm thick).

The glazing may be laminated by methods involving, for example, first a nip roller or using a vacuum ring applied to the edges of the first and second plies of glass to de-gas the PVB layer. The first and second glass plies and the PVB layer are laminated together in an autoclave in the pressure range 6 bar to 14 bar and in the temperature range 110° C. to 150° C.

Figure 2:
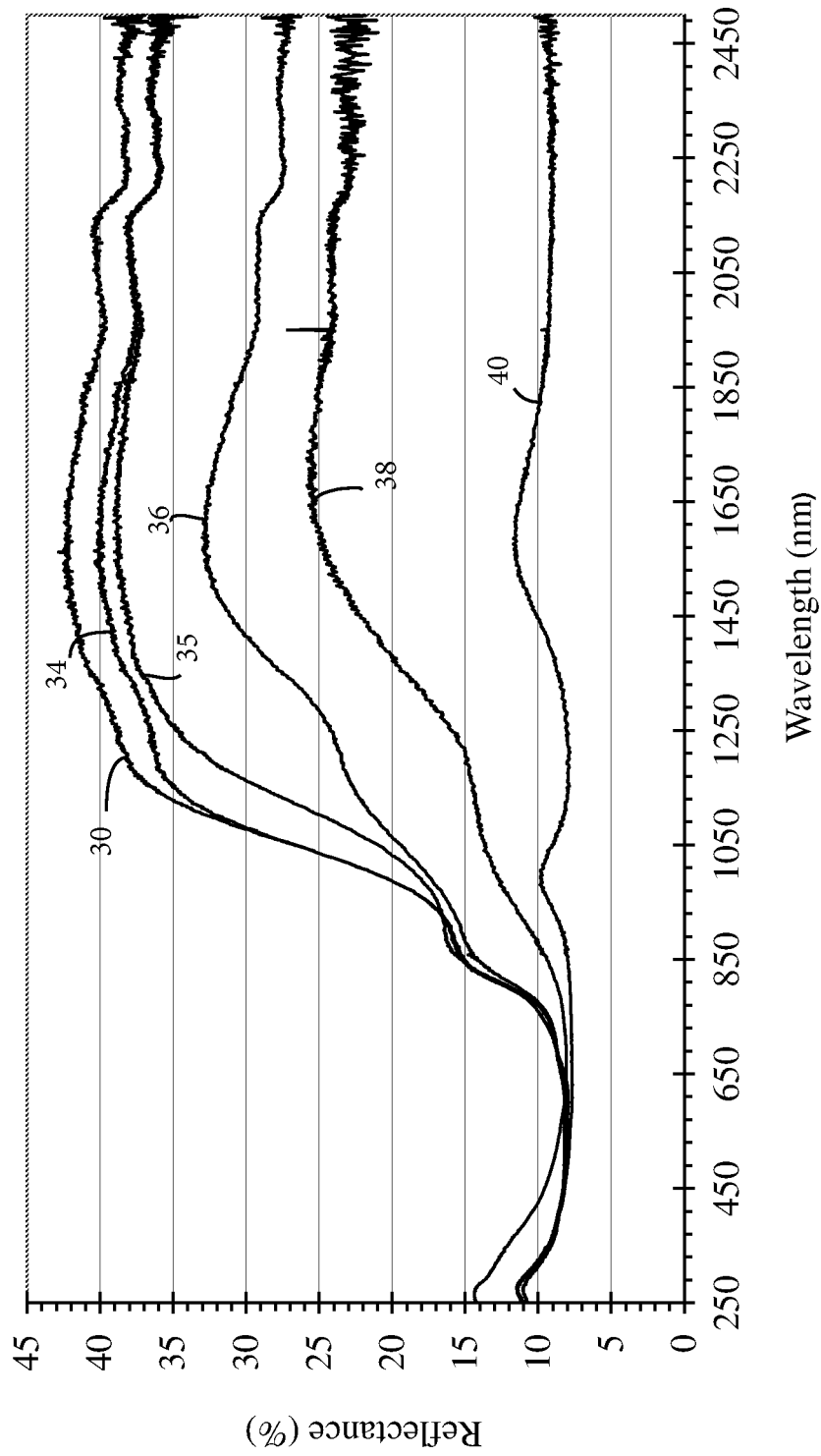
FIG. 2 is a graph showing IR reflectance as a function of wavelength for a number of enamelled glass substrates using enamels according to Example 1, Example 2, Comparative Example A and Comparative Example B.

In FIG. 2, a graph of reflectance as determined by a Perkin Elmer Lambda 950 spectrophotometer as a function of wavelength is shown for samples of fired enamel (at 570° C.) on 4 mm float glass showing difference in properties for enamel as used in Example 1 applied using a 77 threads/cm polyester screen (curve 30) or a 100 threads/cm polyester screen (curve 34), enamel as in Example 2 using a 77 threads/cm polyester screen (curve 35) or a 100 threads/cm polyester screen (curve 36) and enamel as used in Comparative Example B (curve 38) or Comparative Example A (curve 40).

The inventive enamels exhibit reflectance higher than 27% in regions of greater than 400 nm over the range 800 nm to 2250 nm and have proven to be excellent at reducing burnline optical distortion. The enamels used were generally of the composition indicated in Table 1 and Table 2 (Example 1, Example 2 and Comparative Example A, and B), below.

Figure 3:
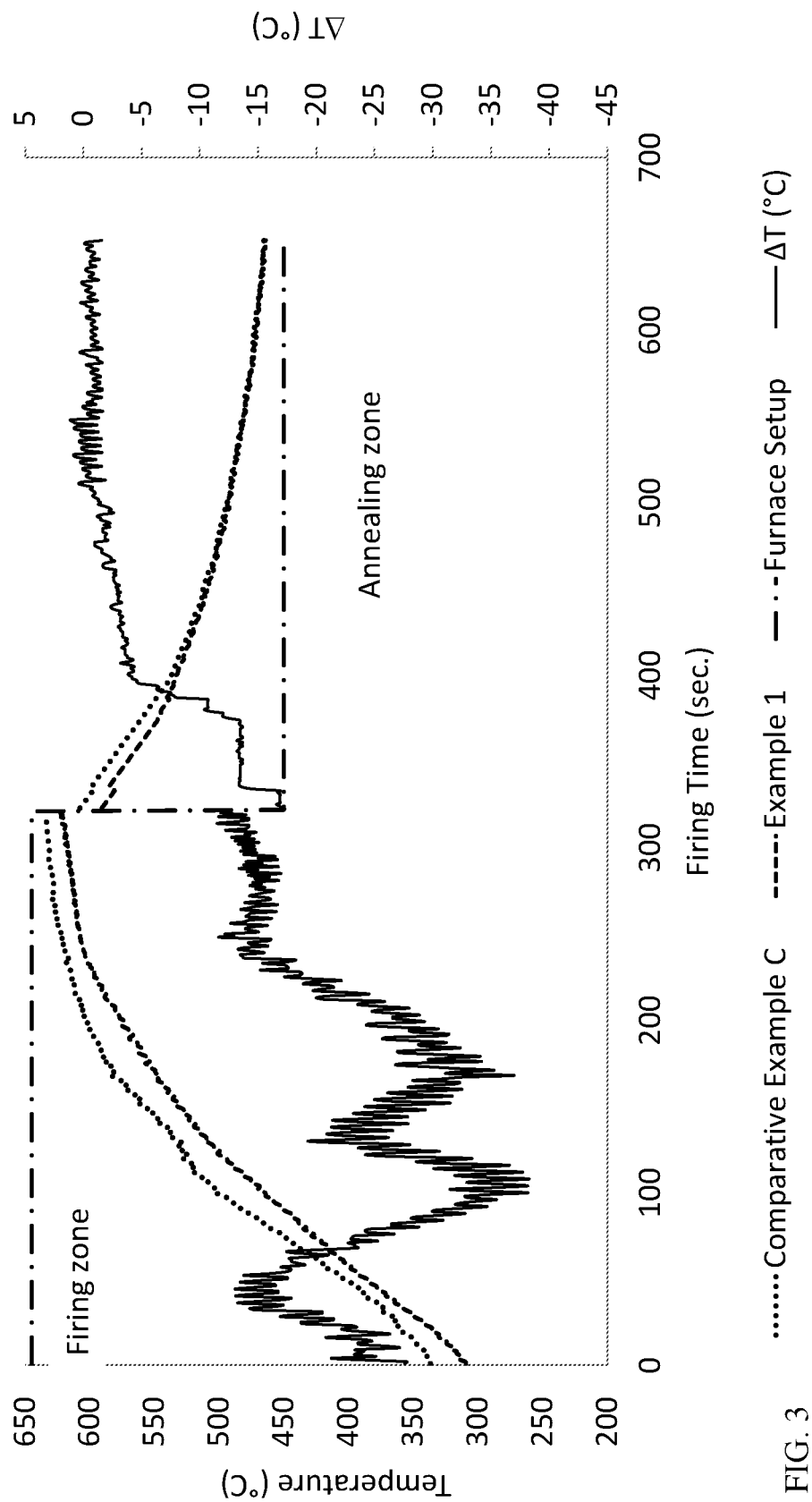
FIG. 3 is a graph showing temperature (T) and ΔT as a function of time for enamelled glass substrates using enamels according to Example 1 and Comparative Example C during the firing and annealing temperature zones of the firing/shaping process.

In FIG. 3, temperature and ΔT as a function of time for enamelled glass substrates using enamels as used in Example 1 (enamel ink composition as indicated in Table 1) and Comparative Example C exhibit a significant difference in temperature throughout the process. As shown in Table 5 and 6, Example 1 enamel exhibits much reduced burnline distortion. While not wishing to be bound, it is thought that because the infra-red reflectance and temperature properties of enamels according to Example 1 are closer to the clear, enamel-free glass, the temperature difference between the enamelled and enamel-free areas is reduced, as is the viscosity difference, and hence so is differential glass flow and optical distortion. The behaviour of enamelled and enamel-free areas at glass bending temperatures becomes more uniform, and therefore optical distortion is less likely to occur.

The invention is further illustrated, but not limited, by the following Examples.

EXAMPLES

Enamel films were produced by screen printing ceramic ink compositions containing either an infrared reflective inorganic pigment according to the present disclosure or an infrared absorbing conventional inorganic pigment. Table 3 presents details of the frit used for Examples 1 and 2 and Comparative Example A:

TABLE 3

| Component | (wt. %) | Variance (wt. %) |
| --- | --- | --- |
| $SiO_2$ | 19.92 | ±5 |
| $Bi_2O_3$ | 59.12 | ±1 |
| ZnO | 2.73 | ±2 |
| $K_2O$ | 0.14 | ±0.5 |
| $Na_2O$ | 3.09 | ±3 |
| $ZrO_2$ | 0.86 | ±0.5 |
| $Al_2O_3$ | 2.14 | ±2 |
| $B_2O_3$ | 10.76 | ±5 |

Each ink formulation used in the Examples contained 59.7 wt. % (+5 wt. %) frit, 23.3 wt. % (±3 wt. %) pigment, and 17 wt. % (±2 wt. %) vehicle. In Example 1 the pigment used was chromium iron oxide pigment brown 29 (CI 77500; CAS 12737-27-8). In Example 2 the pigment used was chromium green black haematite (CI 77288; CAS 68909-79-5).

Enamels according to Examples 1 and 2, were screen printed using a 100 or 77 threads/cm screen to print a ceramic ink composition including a frit and an infrared reflective inorganic pigment, both in accordance with the present disclosure. 20-25 micron thick film (we-firing) resulted from 100 threads/cm screen printing; 26-30 micron thick film (pre-firing) resulted from 77 threads/cm screen printing.

In Comparative Example A the conventional inorganic pigment used was a commercially available standard black pigment.

As stated above, a compositionally similar frit to that which was used in Examples 1 and 2 and in Comparative Example A. The same vehicle was used, which included glycol and glycol ethers as well as a cellulosic resin. Thus, the only variable changed between Examples 1 and 2 and Comparative Example A was the use of an infrared reflective inorganic pigment in Examples 1 and 2 versus the use of an infrared absorbing pigment in Comparative Example A Example 1 had an enamel layer 11.2 μm thick (by SEM after firing), Example 2 had an enamel layer 12.6 μm thick (by SEM after firing) and Comparative Example B had an enamel layer 13.6 μM thick (by SEM after firing).

X-ray diffraction (XRD) was conducted on the printed fired samples for enamels according to Example 1, Example 2 and Comparative Example B using a Bruker D8 Discover X-ray diffractometer using monochromatic Cu Kα1 and Cu Kα2 radiation of wavelengths 0.154056 and 0.154439 nm respectively, emitted with a voltage of 40 kV and a current of 40 mA in an intensity ratio of 2:1.

X ray diffraction shows that (crystalline material only) enamels according to Example 1 and Example 2 contain $CrFeO_3$ (chromium iron oxide) with corundum type structure (rhombohedral). Enamel according to Comparative Example B contains $FeMnNiO_4$ (manganese iron nickel oxide) (cubic).

Burnline Example 1 and Comparative Example B

The composition of the enamel according to Comparative Example B and C is as indicated in Table 4 below. Analysis was semi-quantitative by inductively coupled plasma mass spectrometry (ICP) (for boric oxide and lithium oxide) and X ray fluorescence (XRF) (CERAM, using Methods C201, C15 and BS EN ISO12677). Prior to analysis samples of the ink were dried at 110° C. and fired at a temperature above 400° C. to remove components (including organic components) of the liquid medium.

TABLE 4

| Component | Comparative Example B (dried wt %) | Comparative Example C (dried wt %) |
|---|---|---|
| Aluminium Oxide | 0.59 | 1.58 |
| Antimony (III) Oxide | 0.01 | 0.01 |
| Barium Oxide | 0.16 | 0.01 |
| Bismuth (III) Oxide | 37.81 | 39.95 |
| Boric Oxide (by ICP) | 4.16 | 8.22 |
| Calcium Oxide | 0.02 | 0.01 |
| Chromium (III) Oxide | 5.99 | 18.1 |
| Copper Oxide | 1.08 | 9.5 |
| Hafnium (IV) Oxide | 0.01 | 0.01 |
| Iron (III) Oxide | 2.27 | 0.01 |
| Lead Oxide | 0.02 | 0.02 |
| Lithium Oxide (by ICP) | 1.5 | 0.01 |
| Magnesium Oxide | 0.05 | 0.05 |
| Manganese (II, III) Oxide | 3.62 | 0.02 |
| Nickel Oxide | 2.92 | 0.01 |
| Phosphorus Pentoxide | 0.15 | 0.03 |
| Potassium Oxide | 0.66 | 0.11 |
| Silicon Dioxide | 25.7 | 13.68 |
| Sodium Oxide | 1.4 | 1.94 |
| Strontium Oxide | 0.02 | 0.04 |
| Sulphur Trioxide | 0.05 | 0.07 |
| Tin (IV) Oxide | 0.33 | 0.01 |
| Titanium Dioxide | 2.98 | 0.05 |
| Vanadium Pentoxide | 0.14 | 0.01 |
| Zinc Oxide | 1.49 | 1.65 |
| Zirconium Oxide | 0.13 | 0.51 |

Enamels according to Example 1 and Comparative Example B were screen printed on surface 4 to produce obscuration bands on laminated windscreens generally as discussed above in relation to FIG. 1.

Windscreens were laminated and optical distortion at bottom burnline positions 1 to 5 (referring to the points indicated in FIG. 1(a)) was determined using a Zebra test using a printed white under-sheet having parallel black lines 12 mm apart. Distortion was determined by viewing the distorted black lines against a white board and measuring maximum width and minimum width at five positions across the windscreen. The test is deemed passed if the rate of change (maximum width–minimum width)≤4 mm and the minimum width>8.5 mm. Inclination angle was 60°.

Optical distortion results for two repeat comparative samples for Comparative Example B are given in Table 5, below. Results for two repeat samples for Example 1 are given in Table 6 below. Use of the IR reflective enamel according to the invention significantly reduces burnline optical distortion. In Tables 5 and 6, A indicates Maximum Distortion, B Indicates Minimum Distortion, C indicates Rate of Change and D indicates Distance from Band.

Enamels suitable for use in the invention are available from Prince Minerals Limited, of Duke Street, Fenton, Stoke-on-Trent, Staffordshire, United Kingdom, ST4 3NR; also from Prince Minerals LLC, P.O. Box 251, Quincy, Ill. 62306, USA and 15311 Vantage Parkway West, Suite 350, Houston, Tex. 77032, USA.

TABLE 5

| | Point 1 | | | | Point 2 | | | | Point 3 | | | | Point 4 | | | | Point 5 | | | |
|---|---|---|---|---|---|---|---|---|---|---|---|---|---|---|---|---|---|---|---|---|
| Sample | A | B | C | D | A | B | C | D | A | B | C | D | A | B | C | D | A | B | C | D |
| Comparative Sample no 1 | 12.7 | 8.8 | 3.9 | 33.0 | 12.8 | 8.2 | 4.6 | 39.0 | 12.7 | 6.4 | 6.3 | 37.0 | 13.0 | 7.8 | 5.2 | 44.0 | 12.6 | 8.3 | 4.3 | 45.0 |
| Comparative Sample no 2 | 12.2 | 8.5 | 3.7 | 40.0 | 12.8 | 7.6 | 5.2 | 41.0 | 12.2 | 6.1 | 6.1 | 43.0 | 12.8 | 8.2 | 4.6 | 37.0 | 12.9 | 8.7 | 4.2 | 38.0 |

TABLE 6

| Sample | Point 1 | | | | Point 2 | | | | Point 3 | | | | Point 4 | | | | Point 5 | | | |
|---|---|---|---|---|---|---|---|---|---|---|---|---|---|---|---|---|---|---|---|---|
| | A | B | C | D | A | B | C | D | A | B | C | D | A | B | C | D | A | B | C | D |
| Example Sample no 1 | 12.0 | 10.8 | 1.2 | 38.0 | 12.2 | 9.8 | 2.4 | 39.0 | 12.3 | 9.4 | 2.9 | 45.0 | 12.0 | 10.2 | 1.8 | 36.0 | 12.1 | 11.3 | 0.8 | 34.0 |
| Example Sample no 2 | 12.1 | 10.6 | 1.5 | 34.0 | 12.0 | 9.9 | 2.1 | 41.0 | 12.1 | 9.5 | 2.6 | 42.0 | 12.2 | 10.1 | 2.1 | 39.0 | 12.2 | 10.9 | 1.3 | 38.0 |

The invention claimed is:

1. A laminated glazing comprising a first glass ply having a layer of enamel adhered to at least a first portion of a surface of the first glass ply, a second glass ply, and a polymer ply of interlayer which extends between the first and second glass plies, the enamel comprising 20 to 80 wt % frit and 10 to 50 wt % inorganic pigment, wherein the thickness of the layer of enamel is in the range 2 μm to 50 μm, the inorganic pigment having an infra-red reflectance such that the infra-red reflectance of the first portion of the surface of the first glass ply is 37% or higher over a region in the wavelength range 800 nm to 2250 nm.

2. A laminated glazing as claimed in claim 1, wherein the infra-red reflectance of the first portion of the laminated glazing is 38% or higher over a region in the wavelength range 800 nm to 2250 nm.

3. A laminated glazing as claimed in claim 1, wherein the region in the wavelength range 800 nm to 2250 nm extends over 400 nm or greater.

4. A laminated glazing as claimed in claim 1, wherein the enamel comprises 10 wt % to 40 wt % inorganic pigment.

5. A laminated glazing as claimed in claim 1, wherein the enamel comprises 30 wt % to 80 wt % frit.

6. A laminated glazing as claimed in claim 1, wherein the inorganic pigment comprises a material exhibiting substantially a spinel crystal structure, an inverse spinel crystal structure, a haematite crystal structure, a corundum crystal structure or a rutile crystal structure.

7. A laminated glazing as claimed in claim 1, wherein the inorganic pigment comprises a pigment selected from a Fe/Cr pigment, a Co/Al pigment, a Co/Al/Cr pigment a Co/Ti pigment, a Co/Cr pigment, a Ni/Fe/Cr pigment, a Ti/Cr/Sb pigment, a Fe pigment, a Cr pigment, a chromium-iron pigment, a ferrite pigment, a chromite pigment, a ferrite/chromite pigment (also known as iron chromite) and/or a mixture of two or more of these pigments.

8. A laminated glazing as claimed in claim 1, wherein the inorganic pigment is selected from one or more of pigment blue 28 (CI 77346), pigment blue 29 (CI 77007), pigment green 50 (CI 77377), pigment black 30 (NiCrMn type; CI 77504), pigment black 33 (CI 77537), pigment blue 36 (CI 77343), pigment green 17 (FeCr type; CI 77288), pigment brown 35 (FeCr type; CI 77501), pigment brown 24 (CI 77310), pigment brown 29 (FeCr type; CI 77500), pigment yellow 164 (CI 77899), pigment brown 33 (ZnFeCr type; CI 77503).

9. A laminated glazing as claimed in claim 1, wherein the enamel comprises iron (determined as $Fe_2O_3$) in an amount of 5 wt % or greater of the total weight of the enamel.

10. A laminated glazing as claimed in claim 1, wherein the enamel comprises chromium (determined as $Cr_2O_3$) in an amount of 5 wt % or greater of the total weight of the enamel.

11. A laminated glazing as claimed in claim 1, wherein the enamel comprises chromium (determined as $Cr_2O_3$) in an amount of 25 wt % or lower of the total weight of the enamel.

12. A laminated glazing as claimed in claim 1, wherein the thickness of the enamel layer adhered to the first glass ply is in the range 4 μm to 45 μm.

13. A laminated glazing as claimed in claim 1, wherein the infra-red reflectance of the first portion of the laminated glazing is 39% or higher over a region in the wavelength range 800 nm to 2250 nm.

14. A laminated glazing as claimed in claim 1, wherein the infra-red reflectance of the first portion of the laminated glazing is 40% or higher over a region in the wavelength range 800 nm to 2250 nm.

15. A laminated glazing as claimed in claim 1, wherein the infra-red reflectance of the first portion of the laminated glazing is 41% or higher over a region in the wavelength range 800 nm to 2250 nm.

16. A laminated glazing as claimed in claim 1, wherein the region in the wavelength range 800 nm to 2250 nm extends over 450 nm or greater.

17. A laminated glazing as claimed in claim 1, wherein the region in the wavelength range 800 nm to 2250 nm extends over 550 nm or greater.

18. A laminated glazing as claimed in claim 1, wherein the region in the wavelength range 800 nm to 2250 nm extends over 610 nm or greater.

19. A process for producing a shaped laminated glazing, the process comprising,
   providing a first glass substrate and a second glass substrate,
   providing an enamel ink comprising 20 to 80 wt % frit, 10 to 50 wt % inorganic pigment and 10 to 40 wt % liquid medium,
   applying the enamel ink to at least a first portion of a surface of the first glass substrate,
   optionally drying and/or curing the ink, optionally pre-firing the ink to a temperature above 480° C., and
   shaping at least the first glass substrate by heating to a temperature above 570° C. thereby firing the enamel ink to produce a layer of enamel adhered to at least the first portion of the surface of the first glass substrate, wherein the thickness of the layer of enamel is in the range 2 μm to 50 μm, placing a polymer ply of interlayer between the first and second glass substrates, and
   laminating the first glass substrate, the polymer ply and the second glass substrate together, the enamel being adapted such that the infra-red reflectance of the first portion of the surface of the first glass substrate is 37% or higher over a region in the wavelength range 800 nm to 2250 nm.

* * * * *